(12) United States Patent
Lohde et al.

(10) Patent No.: US 6,394,126 B2
(45) Date of Patent: May 28, 2002

(54) SELF CLEANING IRRIGATION VALVE WITH OFFSET MANUAL ON ACTUATOR, BODY/BONNET ALIGNMENT AND CAPTURED SCREWS

(75) Inventors: Dan Lohde, Aliso Viejo; John Larry Kent, Moreno Valley; Alan Dawn, Murrieta, all of CA (US)

(73) Assignee: The Toro Company, Minneapolis, MN (US)

( * ) Notice: Subject to any disclaimer, the term of this patent is extended or adjusted under 35 U.S.C. 154(b) by 0 days.

(21) Appl. No.: 09/911,220

(22) Filed: Jul. 23, 2001

Related U.S. Application Data (62) Division of application No. 09/320,042, filed on May 26, 1999, now Pat. No. 6,263,901.

(51) Int. Cl.[7] .......................... F16K 43/00; F16K 31/02
(52) U.S. Cl. .............................. 137/315.01; 137/315.03
(58) Field of Search ........................... 251/30.01, 30.02, 251/30.03, 30.04, 30.05, 45, 46; 411/13, 14, 411, 424; 137/315.01, 315.03

(56) References Cited

U.S. PATENT DOCUMENTS

| | | | | |
|---|---|---|---|---|
| 2,693,823 A | * | 11/1954 | Sogge ...................... | 251/30.02 |
| 3,367,621 A | * | 2/1968 | Griswold ..................... | 251/46 |
| 3,556,464 A | * | 1/1971 | Griswold ..................... | 251/46 |
| 3,905,575 A | * | 9/1975 | Zeuner et al. ........... | 251/30.02 |
| 3,911,955 A | * | 10/1975 | Link ....................... | 251/30.02 |
| 3,967,808 A | * | 7/1976 | Lieding ........................ | 251/46 |
| 4,135,696 A | * | 1/1979 | Saarem et al. ........... | 251/30.02 |
| 4,180,236 A | * | 12/1979 | Saarem et al. ................. | 251/46 |
| 4,607,422 A | * | 8/1986 | Scaramucci ............ | 137/315.01 |
| 4,657,038 A | * | 4/1987 | Lyons ..................... | 251/30.02 |
| 5,632,465 A | * | 5/1997 | Cordua .................... | 251/30.02 |
| 5,794,651 A | * | 8/1998 | Miller ..................... | 251/30.02 |

* cited by examiner

Primary Examiner—George L. Walton
(74) Attorney, Agent, or Firm—James W. Miller (57) ABSTRACT

An irrigation valve comprises a valve housing made from a valve body joined to a valve bonnet by a plurality of attachment screws. The valve body and valve bonnet have an alignment rib received in an alignment notch when the body and bonnet are joined together such that the holes that receive the attachment screws are automatically aligned with one another. The attachment screws have a smooth portion adjacent a threaded portion such that the smooth portion when visible signals to the user that the attachment screws are clear of the valve body but are still captured in the valve bonnet. The valve includes a solenoid that may be remotely actuated to open the valve. An L-shaped actuator arm is also operatively connected to the solenoid for manually opening the valve with the upper portion of the actuator arm being closer to the user than in previous valves and thus easier to grip and turn. Finally, a metering pin in the valve has a flexible mounting which permits side-to-side motion in a metering hole in the valve member to allow the valve to be self cleaning.

7 Claims, 5 Drawing Sheets

SELF CLEANING IRRIGATION VALVE WITH OFFSET MANUAL ON ACTUATOR, BODY/BONNET ALIGNMENT AND CAPTURED SCREWS

This application is a division of application Ser. No. 09/320,042, filed May 26, 1999, now U.S. Pat. No. 6,263,901.

TECHNICAL FIELD

This invention relates to an irrigation valve for controlling the flow of water in the piping of an irrigation system. More particularly, this invention relates to an irrigation valve which is easier to assemble and operate than prior art valves and which is self cleaning during operation.

BACKGROUND OF THE INVENTION

Flow control valves are well known in irrigation systems. They control the flow of water through an upstream pipe and thereby turn sprinklers fed by the pipe on and off. Such valves are often remotely controlled by control signals sent from an automated irrigation controller. For example, the controller often sends an electric actuating signal to a solenoid that is part of the valve to open the valve.

Some irrigation valves also include a "manual on" feature that involves manually manipulating the solenoid relative to the valve housing. An actuator arm sticks out beneath the solenoid. The user can grip and rotate this arm to partially unscrew the fitting in which the solenoid is received. This manually opens the valve. The actuator arm can be rotated back to its original position to restore the solenoid to its normal operational position to close the valve.

This type of actuator arm used to effect a "manual on" operation of the valve can be difficult to find and grip. It is horizontal and located beneath the solenoid near the top of the valve. Since the valve is itself often located within a valve box, and since the valve box is sometimes filled with water thus partially or completely submerging the valve, the actuator arm may not be visible to the user. In these circumstances, the user must reach down and find and rotate the actuator arm by feel.

Irrigation valves of this type often include a valve housing that is formed from a valve body that is closed by a bonnet. A plurality of attachment screws extend through mating surfaces in the valve body and the bonnet to join these two components together. The task of assembling the valve is made more difficult by the need to align the screw receiving holes in the bonnet with the screw receiving holes in the valve body. Moreover, it is easy to lose the attachment screws when the bonnet is disassembled from the valve body.

Finally, valves of this type often use a metering pin that extends through a metering hole in the valve member. Water passes from one side of the valve member to the other around the metering pin which is sized to be slightly smaller in diameter than the diameter of the metering hole. However, sand and other small debris can often lodge between the metering hole and the metering pin, thereby interfering with the proper operation of the valve or potentially disabling the valve. It would be desirable for the valve to be able to pass or dislodge such debris during operation of the valve and to thereby be self-cleaning.

SUMMARY OF THE INVENTION

It is one aspect of this invention to provide an irrigation valve that is easier to assemble. This is provided by an irrigation valve which includes a valve housing having an inlet, an outlet, a flow passageway between the inlet and outlet, a valve seat in the flow passageway, and a valve member which closes the valve by moving into engagement with the valve seat for blocking flow between the inlet and the outlet and which opens the valve by moving out of engagement with the valve seat for permitting flow between the inlet and the outlet. The valve housing is formed from a valve body and a valve bonnet which are joined together. The valve body and valve bonnet each have a plurality of attachment holes which receive a plurality of attachment members to join the valve body and valve bonnet together. At least one alignment member and at least one alignment recess are provided on the valve body and valve bonnet with the alignment member(s) and alignment recess(es) interfitting together when the valve body and valve bonnet are joined together. The alignment member(s) and alignment recess(es) are so disposed on the valve body and valve bonnet that the attachment holes in the valve bonnet overlie the attachment holes in the valve body when the alignment member(s) and alignment recess(es) are interfitted together.

Another aspect of this invention that relates to ease of assembly, and of disassembly, is an irrigation valve which includes a valve housing having an inlet, an outlet, a flow passageway between the inlet and outlet, a valve seat in the flow passageway, and a valve member which closes the valve by moving into engagement with the valve seat for blocking flow between the inlet and the outlet and which opens the valve by moving out of engagement with the valve seat for permitting flow between the inlet and the outlet. The valve housing is formed from a valve body and a valve bonnet which are joined together. The valve body and valve bonnet each have a plurality of attachment holes which receive a plurality of attachment members to join the valve body and valve bonnet together. Each attachment member has an indicator along its length to signal to the user that the attachment member is clear of the valve body when the indicator is visible to the user.

Another aspect of this invention is to provide an irrigation valve that is easier to operate. This is provided by an irrigation valve which includes a valve housing having an inlet, an outlet, a flow passageway between the inlet and outlet, a valve seat in the flow passageway, and a valve member which closes the valve by moving into engagement with the valve seat for blocking flow between the inlet and the outlet and which opens the valve by moving out of engagement with the valve seat for permitting flow between the inlet and the outlet. A solenoid is carried on the valve housing. The solenoid opens the valve when an electrical actuating signal is received by the solenoid. An actuator arm is operatively coupled to the solenoid for manipulating the solenoid relative to the housing to manually open the valve when the actuator arm is moved by the user. The actuator arm has an offset configuration such that an upper portion of the actuator arm is located vertically above a lower portion of the actuator arm such that the upper portion of the actuator arm is more easily gripped by the user.

Yet another aspect of this invention is to provide an irrigation valve that more easily self cleans during operation. This is provided by an irrigation valve which includes a valve housing having an inlet, an outlet, a flow passageway between the inlet and outlet, a valve seat in the flow passageway, and a valve member which closes the valve by moving into engagement with the valve seat for blocking flow between the inlet and the outlet and which opens the valve by moving out of engagement with the valve seat for permitting flow between the inlet and the outlet. A pressure chamber is provided in the valve housing. One side of the valve member is exposed to inlet fluid pressure tending to move the valve member away from the valve seat and the other side of the valve member is exposed to fluid pressure in the pressure chamber tending to move the valve member towards the valve seat. A metering pin is supported in the valve housing with the metering pin extending through a metering hole in the valve member with a clearance fit and with the valve member sliding up and down on the metering pin as the valve member moves relative to the valve seat during opening and closing of the valve. Inlet fluid pressure passes from the one side of the valve member through the metering hole in the clearance fit between the metering hole and the metering pin to fill the pressure chamber with inlet fluid pressure to close the valve. The metering pin is configured and supported within the valve housing to allow the metering pin to move from side-to-side within the metering hole as the valve member slides up and down on the metering pin during opening and closing of the valve, thereby to help prevent debris from causing the valve member to stick or hang up on the metering pin.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 3:
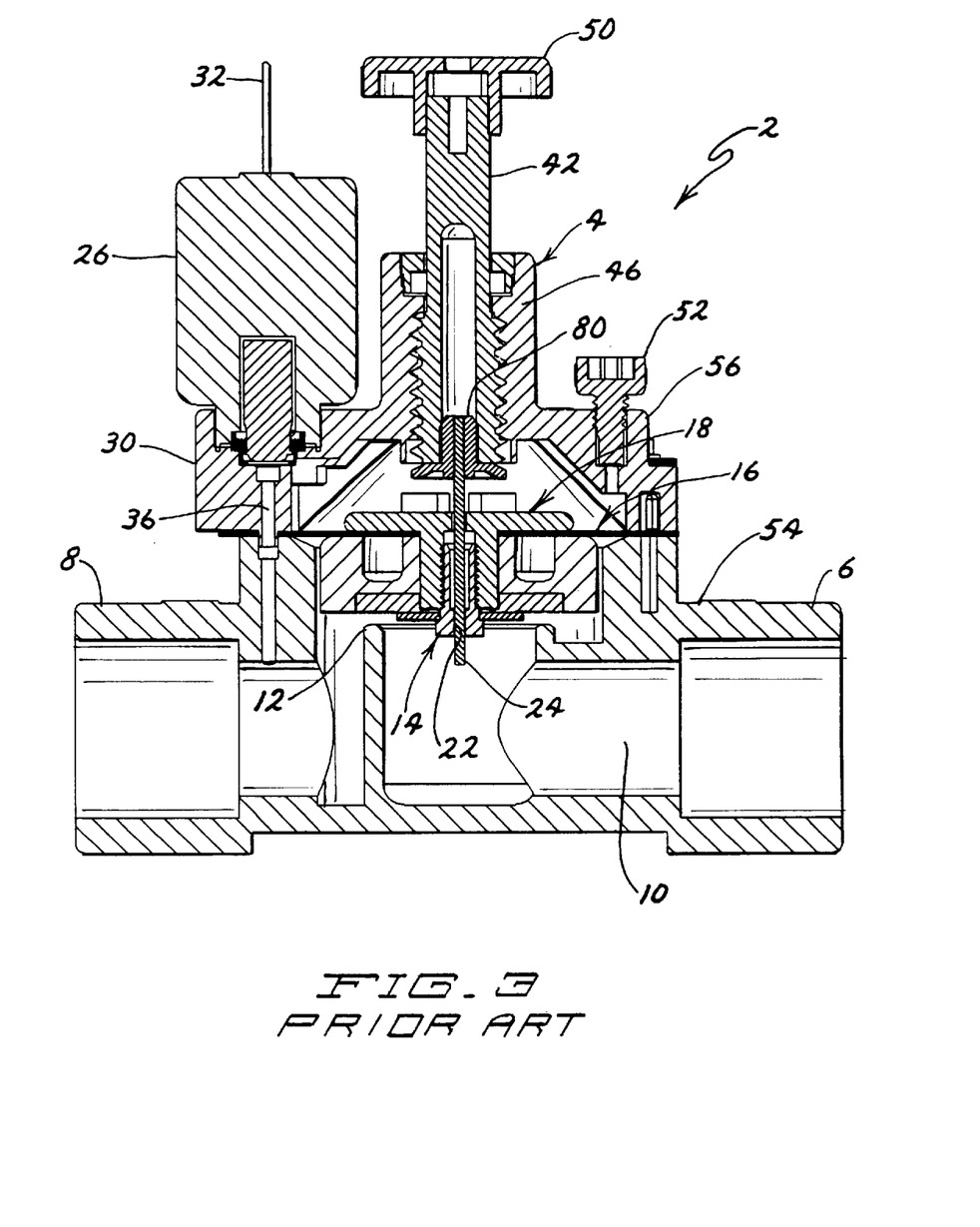
FIG. 3 is a longitudinal cross-sectional view similar to that of FIG. 2, but illustrating a prior art irrigation valve rather than the irrigation valve of FIG. 1.

The irrigation valve of this invention will be described by comparing and contrasting it with a known prior art irrigation valve. The irrigation valve of this invention is illustrated in FIGS. 1, 2, 4 and 5. The prior art irrigation valve, which is a 205 Series Irritrol® Valve, is illustrated in FIG. 3. When the valve of this invention and the prior art valve have the same or corresponding components, the same reference numeral will be used with respect to these components in both valves. Different reference numerals will be used to point to the different features or components in the valve of this invention which comprise improvements over the prior art valve.

An irrigation valve 2 according to this invention comprises a valve housing 4 that can be installed in the piping of an irrigation system. Valve housing 4 includes an inlet 6 that receives an inlet pipe (not shown) of the irrigation system with the inlet pipe carrying water under pressure. Valve housing 4 includes an outlet 8 that similarly receives an outlet pipe (not shown) of the irrigation system. When valve 2 is open, a flow passageway 10 in valve housing 4 is opened allowing water to flow from inlet 6, through flow passageway 10, and then out through outlet 8.

An annular valve seat 12 is located inside valve housing 4 in flow passageway 10. A valve member 14 that is formed at least partially from a resilient diaphragm 16 is movable towards and away from valve seat 12. Valve 2 is closed when valve member 14 is urged against valve seat 12 as depicted in both FIGS. 2 and 3. Valve 2 is open when valve member 14 is lifted off valve seat 12.

Water under pressure at inlet 6 constantly acts on the underside of valve member 14 inside valve seat 12 urging valve member 14 up off valve seat 12. However, this force is counteracted by the same water pressure in a pressure chamber 18 formed in valve housing 4 above valve member 14. This balancing water pressure is able to act on a larger area of valve member 14 in pressure chamber 18 than the area acted on by the inlet water pressure, i.e. the area on the underside of valve member 14 located within valve seat 12, to develop a net force that biases valve member 14 into engagement with valve seat 12. If desired, a spring 20 can be used within pressure chamber 18 further urging valve member 14 into engagement with valve seat 12. Thus, in the closed position of valve 2, the inlet water pressure urging valve member 14 upwardly is opposed and overcome by inlet water pressure within pressure chamber 18 and by the force of spring 20, both of which jointly urge valve member 14 down into engagement with valve seat 12.

Inlet water pressure is admitted into pressure chamber 18 from beneath valve member 14 through a metering hole 22 located in the center of valve member 14. A metering pin 24 extends downwardly through metering hole 22 and has a clearance fit of approximately 0.005 inches with metering hole 22, i.e. the outside diameter of metering pin 24 is smaller than the inside diameter of metering hole 22. The rate at which water passes into pressure chamber 18 is controlled by the amount of the clearance fit between metering pin 24 and metering hole 22. In any event, regardless of the rate of the water passage, water under pressure will be metered upwardly into pressure chamber 18 through metering hole 22 around metering pin 24 until the water pressure in pressure chamber 18 eventually approaches and attains the inlet water pressure to keep valve 2 in its closed position.

Valve 2 is opened by bleeding off at least a portion of the water pressure in pressure chamber 18 at a faster rate than water is being metered into pressure chamber 18 through metering hole 22. A solenoid 26 is coupled by a threaded fitting 28 to a socket 30 in the top of valve housing 4 and extends upwardly therefrom. When an electrical actuating signal is sent to solenoid 26 along connecting wires 32 from an automated controller (not shown), the plunger of solenoid 26 is lifted to allow a bleed passage 36 extending into pressure chamber 18 to be opened to bleed the water inside pressure chamber 18 to downstream through outlet 8. Since this bleed is much more rapid than the rate at which water enters pressure chamber 18 through metering hole 22, the pressure in pressure chamber 18 is lowered to a point at which the pressure in pressure chamber 18 and the force of spring 20 is lower than the force of the inlet water pressure acting on the underside of valve member 14. This allows valve member 14 to lift up off valve seat 12 to open valve 2.

Sending an actuating signal to solenoid 26 is only one way to open irrigation valve 2. Valve 2 can also be opened manually by grabbing and rotating an actuator arm 40 that is connected to fitting 28 which carries solenoid 26. Actuator arm 40 is keyed or splined to fitting 28 so that rotating actuator arm 40 lifts fitting 28 relative to valve housing 4. Lifting solenoid fitting 28 also opens the downstream bleed passage 36 to again allow the water in pressure chamber 18 to bleed out a faster rate than the incoming metered flow, thus opening valve 2. Valve 2 is manually shut off by rotating actuator arm 40 back in the opposite direction to lower and restore fitting 28 to its original position in which it shuts off the downstream bleed passage 36.

The use of an actuator arm such as arm 40 to rotate a threaded fitting such as fitting 28 of a solenoid to manually turn an irrigation valve on is well known in the irrigation art. Such an arm/fitting combination is shown in U.S. Pat. No. 4,336,918, which patent is hereby incorporated by reference. The precise manner in which the arm/fitting effects a bleed of water pressure from pressure chamber 18 is not important to this invention and can obviously be varied.

Valve housing 4 includes a threaded flow control stem 42 that extends vertically through the top of valve housing 4. The lower end 44 of flow control stem 42 is received inside pressure chamber 18 of valve housing 4 and is spaced from valve member 14. Lower end 44 of flow control stem 42 is externally threaded to be received in an internally threaded boss 46 in the top of valve housing 4. Flow control stem 42 extends upwardly to terminate in an upper end that is located outside valve housing 4. A knob 50 is carried on the upper end of flow control stem 42 to allow the user to grip and rotate flow control stem 42 relative to valve housing 4 from above and outside of valve housing 4.

Rotating knob 50 and hence flow control stem 42 relative to valve housing 4 raises and lowers flow control stem 42. Valve member 14 abuts against lower end 44 of flow control stem 42 when the valve is fully open. Thus, adjusting the position of lower end 44 of flow control stem 42 relative to valve housing 4 adjusts the amount of flow through valve 2 when valve 2 is open. If lower end 44 of flow control stem 42 is closer to valve seat 12, then less water will flow through valve 2 when valve 2 is fully open as compared to when lower end 44 of flow control stem 42 is further away from valve seat 12. In addition, flow control stem 42 can be screwed all the way down to abut against valve member 14 when such valve member 14 is in engagement with valve seat 12 to shut valve 2 completely off.

A manual bleed screw 52 is also provided on the top of valve housing 4. When manual bleed screw 52 is removed from its port, the water in pressure chamber 18 will bleed directly to atmosphere, again allowing valve 2 to open. Manual bleed screw 52 is often used when it is desired to flush the piping connected to valve 2 since a full pressure differential is developed across valve member 14, thus ensuring that valve member 14 will quickly move to its fully open position. It also allows a visual indication to the user that valve 2 is open.

Valve housing 4 is formed from two major housing components that are releasably secured together. These components comprise a valve body 54 and a cap 56 which is commonly referred to as a valve bonnet and will be so referred to hereafter in this Detailed Description. Valve body 54 and valve bonnet 56 have mating portions that are provided with a plurality of threaded holes 58 that may be aligned with one another. A plurality of threaded attachment members 60, preferably screws but alternatively comprising bolts, extend down through valve bonnet 56 and into valve body 54 and when tightened hold valve bonnet 56 on valve body 54. The rim of the flexible diaphragm portion 16 of valve member 14 is clamped between valve bonnet 56 and valve body 54 when the two are secured together.

As described thus far, irrigation valve 2 is typical of those in the prior art. For example, the Irritrol® 205 Series Valves have the features described above as shown in FIG. 3, with the exception that the actuator arm 40 and threaded fitting 28 is not shown on this prior art valve. However, such an arm/fitting combination per se is well known on irrigation valves as shown in U.S. Pat. No. 4,336,918. Accordingly, the remaining portions of this Detailed Description will describe the novel and unique features of valve 2 of this invention by describing and specifically illustrating the differences between valve 2 of this invention and the prior art valves shown in FIG. 3 and in the 918 patent.

The prior art irrigation valves of this type have proven difficult to assemble during manufacture and also to disassemble and reassemble in the field for service or repair. Threaded attachment members 60 holding valve bonnet 56 to valve body 54 have typically been threaded over their entire length. Thus, such members 60 are usually completely removed to disassemble the valve and once removed are prone to being lost. Moreover, in assembling the valve initially or reassembling the valve after it has been disassembled, threaded holes 58 in valve body 54 have to be aligned with the corresponding holes 58 in valve bonnet 56. This can be difficult and time consuming to do.

Figure 1:
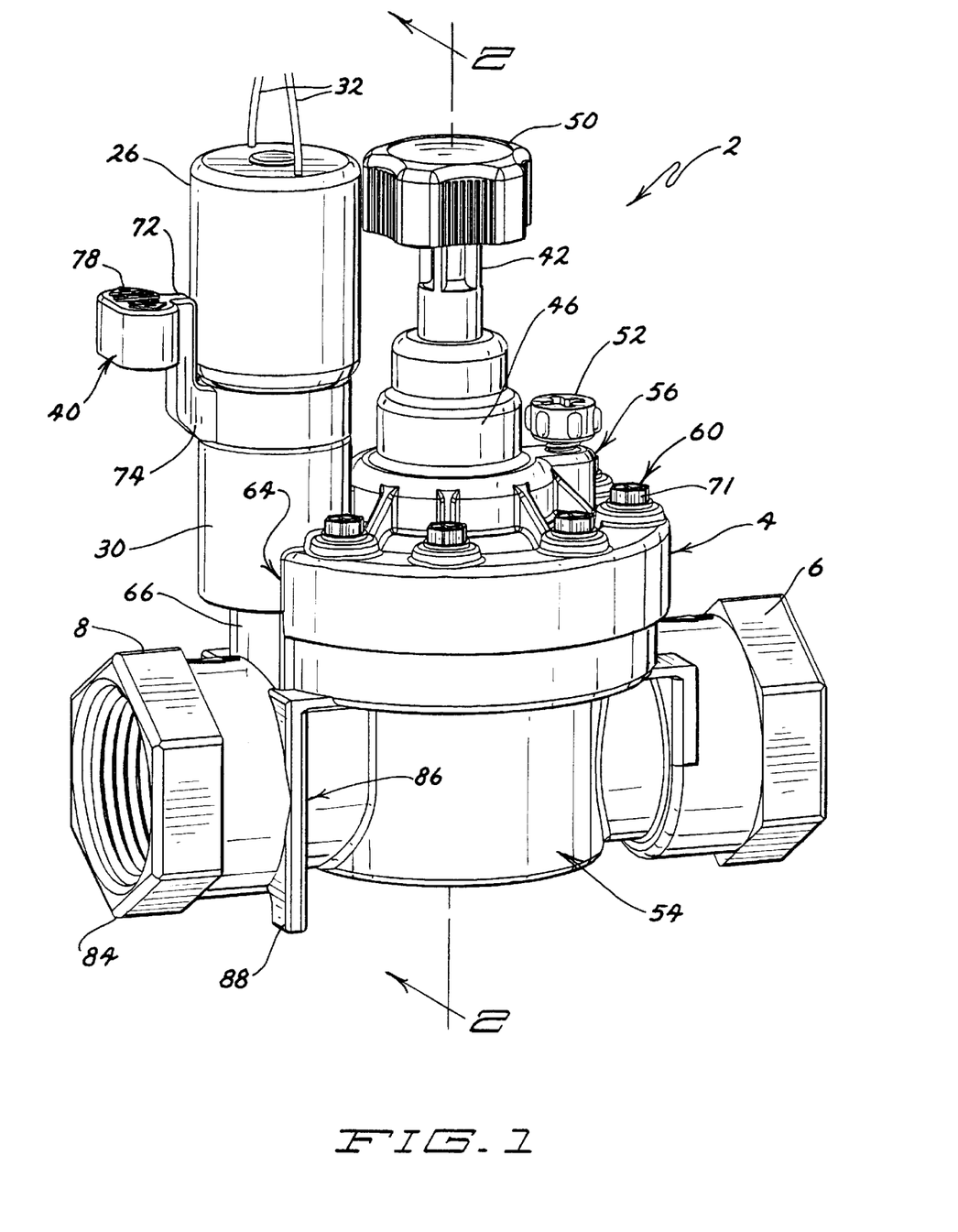
FIG. 1 is a perspective view of an irrigation valve according to this invention.
Figure 2:
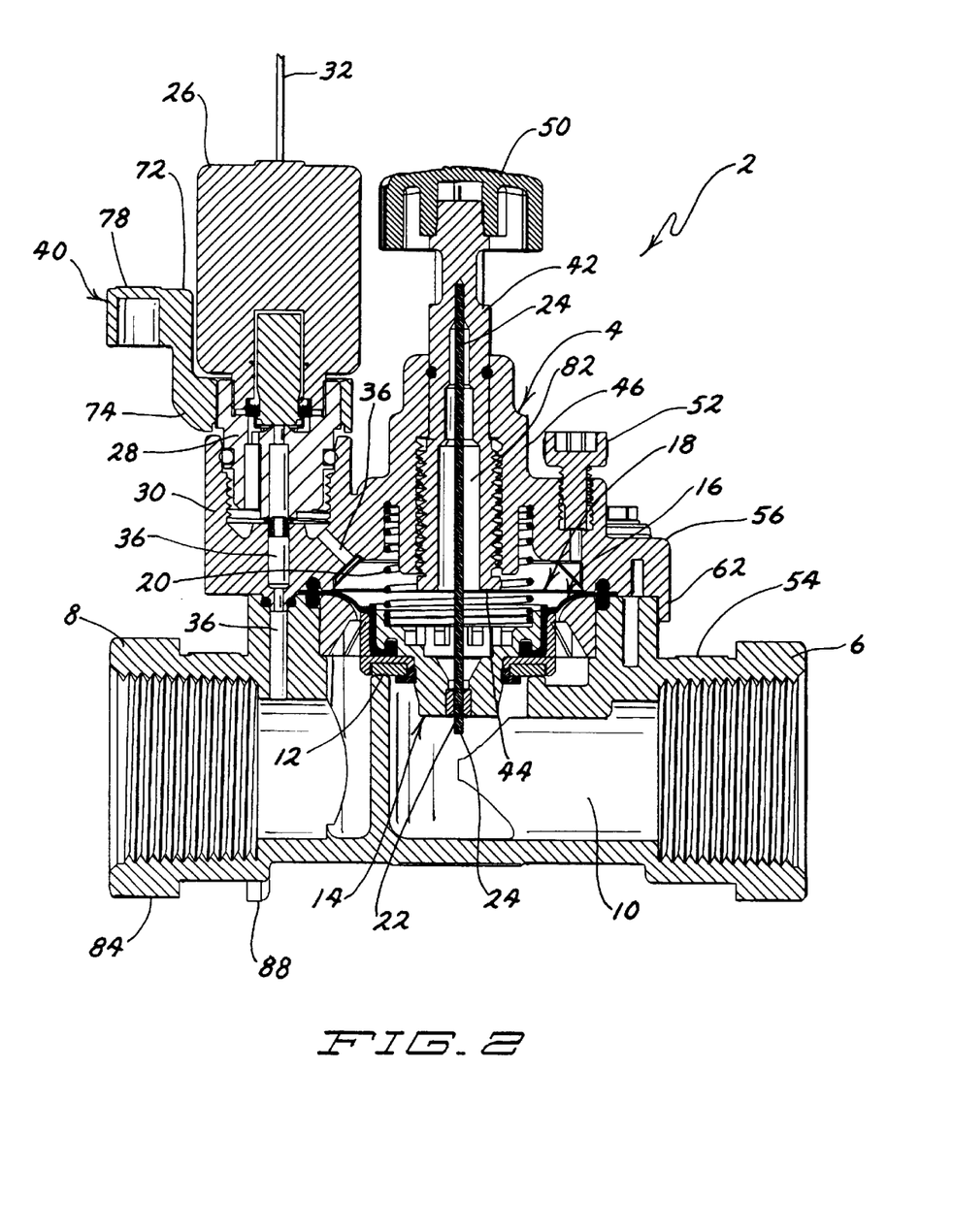
FIG. 2 is a longitudinal cross-sectional view of the irrigation valve of FIG. 1, taken along lines 2—2 in FIG. 1.
Figure 4:
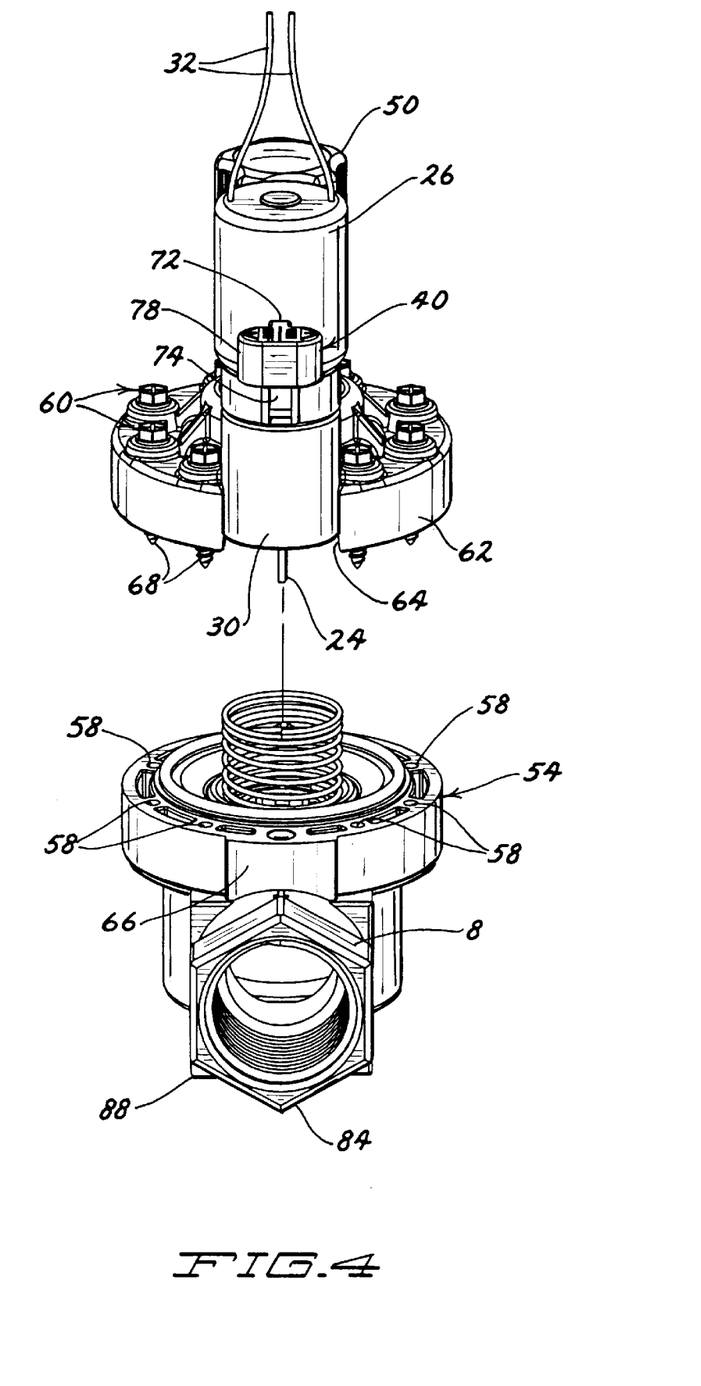
FIG. 4 is a perspective view of the outlet end of the irrigation valve of FIG. 1 with the valve bonnet shown exploded away from the valve body, illustrating both the offset actuator arm for a "manual on" valve actuation as well as the alignment rib and notch between the valve body and the bonnet.
Figure 5:
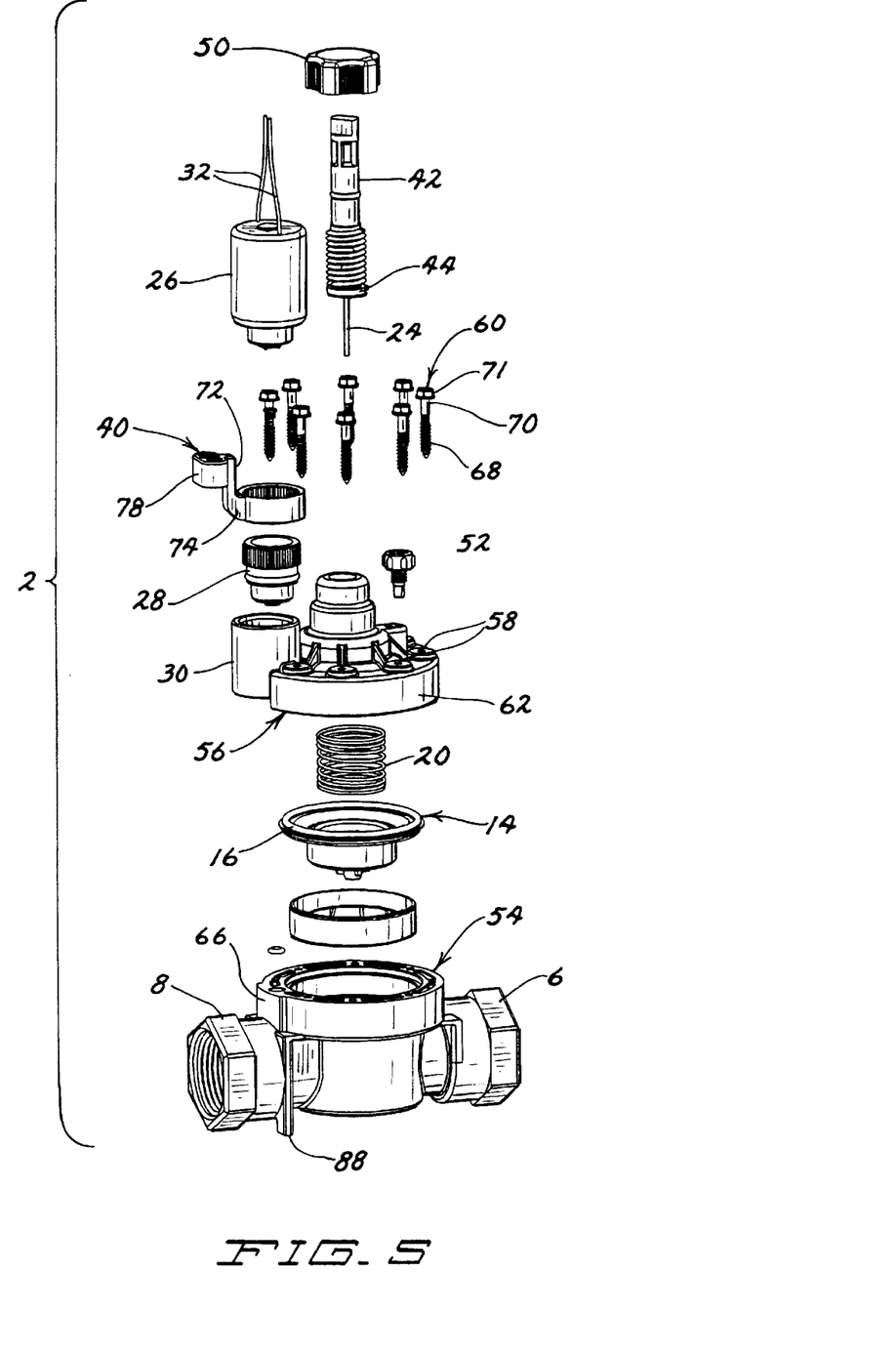
FIG. 5 is an exploded perspective view of the irrigation valve of FIG. 1.

Valve 2 according to this invention eases the task of assembling valve 2, both initially and after the valve is disassembled. Referring now to FIGS. 1,3 and 4, valve bonnet 56 is provided with an extended skirt 62 that has a diameter slightly greater than the diameter of the top of valve body 54 to allow skirt 62 of valve bonnet 56 to be concentrically received around the top of valve body 54. Referring to FIG. 4, an alignment recess comprising a notch 64 is provided in skirt 62 at one location underlying the socket 30 that holds solenoid 26. An alignment member comprising a rib 66 is provided on the outside of valve body 54 with alignment rib 66 being sized to be closely received within notch 54 when skirt 62 of valve bonnet 56 is received around the top of valve body 54. Alignment rib 66 protrudes radially outwardly from an exterior surface of valve body 54.

When alignment rib 66 is received in notch 54, threaded holes 58 in valve bonnet 56 are automatically aligned with their counterparts in valve body 54, thus obviating the need for manual alignment. Alignment rib 66 and notch 64 as shown herein allow valve bonnet 56 to be assembled onto valve body 54 in only a single position in which attachment holes 58 in both automatically overlie one another. There is no need for the user to manually rotate valve bonnet 56 on valve body 54 to seek a manual hole alignment, thus saving time in assembling bonnet 56 to valve body 54.

In addition, the threaded attachment members 60 are no longer threaded over their entire length. The lower portion 68 of each member 60 is threaded, but the upper portion 70 of each member 60 beneath the head 71 of each member 60 is now smooth and unthreaded. The relative lengths of the lower and upper portions 68 and 70 are chosen so that threaded attachment members 60 will be completely removed from holes 58 in valve body 54 when the junction between the threaded and smooth portions 68 and 70 becomes visible to the user who is unscrewing member 60. In effect, the junction between the threaded and smooth portions 68 and 70 forms a visual indicator that can be seen by the user as soon as it reaches the surface of valve housing 4. At this location, i.e. when the junction between the threaded and smooth portions of member 60 is at the top of hole 58 in valve bonnet 56 such that the entire smooth portion 70 is visible to the operator, member 60 will be completely removed from the counterpart hole 58 in valve body 54 but will still be captured by hole 58 in valve bonnet 56.

The use of threaded attachment members 60 with both threaded and smooth portions 68 and 70 as described above and shown in the drawings allows valve 2 to be more easily disassembled and reassembled for service or repair. The user need only unscrew threaded attachment members 60 until their smooth portions 70 are showing. At that point all of the threaded attachment members 60 will have cleared their holes 58 in valve body 54 but will still be retained in the holes 58 in valve bonnet 56. Valve bonnet 56 can then be lifted off valve body 54 without fear of losing threaded attachment members 60 since threaded attachment members 60 will be retained in valve bonnet 56. After any necessary work is done on the valve, valve bonnet 56 can be replaced on valve body 54, using alignment rib 66 and notch 64 to automatically align holes 58 in valve bonnet 56 with holes 58 in valve body 54, and the threaded attachment members 60 will still be in valve bonnet 56 ready to be driven downwardly into the now aligned holes in valve body 54.

While the use of the above noted threaded attachment members 60 is particularly useful during field disassembly and reassembly of valve 2, where losing threaded attachment members 60 is more of a problem, they are also useful during initial assembly of valve 2. Threaded attachment members 60 can be preassembled in valve bonnet 56 before valve bonnet 56 is placed on valve body 54. Then, during final assembly, the assembler need only drive threaded attachment members 60 downwardly without having to individually place or assemble threaded attachment members 60 into valve bonnet 56.

Another feature of valve 2 of this invention is the use of a "manual on" actuator arm 40 in conjunction with solenoid 26 whose upper portion 72 is vertically offset above its lower portion 74. As shown in the drawings, lower portion 74 of actuator arm 40 comprises that portion of the arm which is splined around threaded solenoid fitting 28.

Arm 40 is not horizontal as in prior art valves, but is L-shaped having a vertical leg extending upwardly from lower portion 74 of actuator arm 40. Upper portion 72 of actuator arm 40 includes a horizontal tab or grip 78. Tab or grip 78 may have directional arrows and words which indicate to the user the direction for turning arm 40 to manually turn valve 2 on or off.

The L-shaped actuator arm 40 of this invention is more convenient and easy to grip than the horizontal actuator arms of prior art valves. Accordingly, the user can find and grip this arm more easily, particularly when valve 2 is located, as it often is, in a valve box.

Metering pin 24 has an improved construction in valve 2 of this invention. This improvement is best understood by first reviewing the structure of metering pin 24 in the prior art valve.

As shown in the prior art valve depicted in FIG. 3, metering pin 24 is supported within the rotatable flow control stem 24. However, the pin is fairly short (approx. 1.62 inches in length) and is supported at the bottom of flow control stem 42. Flow control stem 42 has a plug 80 at its lower end which rigidly supports the top end of metering pin 24. Metering pin 24 typically comprises a pin having an outer diameter of approximately 0.063 inches and is made from 302 Stainless Steel.

The net result of this pin mounting structure in the prior art valve 2 is that pin 24 is fairly rigid relative to valve member 14 and side-to-side motion of pin 24 within metering hole 22 does not occur. Consequently, grit and debris, such as sand, can sometimes become lodged between metering pin 24 and the inside diameter of metering hole 22. This, in turn, can prevent valve member 14 from smoothly sliding up and down on metering pin 24 and can, in extreme cases, cause valve member 14 to become stuck upwardly on metering pin 24 in a partially open position. This is disadvantageous because valve 2 never fully shuts off the water flow. A repair trip is then necessary to disassemble and clean valve 2, which is of course a costly procedure that one desirably would wish to avoid.

Valve 2 of this invention has an improved configuration and mounting for metering pin 24. Plug 80 is deleted from flow control stem 42 such that the hollow interior bore 82 existing within flow control stem 42 is open from below. In fact, the length of this bore 82 is extended as much as possible in flow control stem 42 such that bore 82 now rises to a top end that is closely adjacent the top of flow control stem 42. This allows a much longer pin 24 to now be used, e.g. a pin of approximately 3.25 inches, with pin 24 now being supported in a cantilever manner only at the top end of longitudinal bore 82 inside flow control stem 42. Thus, pin 24 has only one point of support at its very top end at the top of flow control stem 24 and is almost twice the length of what it was in the prior art valve..

The doubling in the length of pin 24 and the use of only one point of support at its top end now allows pin 24 to flex or bend about its support point to provide side-to-side motion of pin 24 within metering hole 22 as valve member 14 axially slides up and down on pin 24. The Applicants' have found that this side-to-side motion of metering pin 24 relative to metering hole 22 in valve member 14 allows valve member 14 to be self-cleaning. In other words, any grit or debris tending to jam in metering hole 22 between pin 24 and the hole now is usually dislodged or cleaned away due to the ability of pin 24 to move sideways in metering hole 22 as valve member 14 travels up and down over pin 24. Accordingly, the valve of this invention is much more resistant to being jammed in a partially open position.

Inlet 6 and outlet 8 of valve 2 of this invention comprise hex head fittings where one of the ridges 84 between adjacent lands of the hex head fitting is located as the lowermost point of valve 2 on each end of valve 2. Thus, referring to the prior art valve shown in FIG. 3, valve 2 is not self-supporting on a flat surface, but falls to one side or the other when placed on such a surface.

Valve 2 of this invention includes a cradle 86 on one end of valve 2 protruding downwardly from valve housing 4. The legs 88 of cradle 86 terminate in a common plane that is beneath the lowermost ridge 86 on the hex head fitting on that end of valve 2. While only one leg 88 is shown in the drawings, another identically shaped leg 88 is disposed on the other side of valve housing 4 and is simply hidden in the drawings. Cradle 86 allows valve housing 4 to remain upright on a flat surface without rolling or falling to one side or the other. This eases the task of displaying or installing valve 2.

Various modifications of this invention will be apparent to those skilled in the art. For example, while the alignment rib 66 has been shown herein as being formed on valve body 54 and notch 64 on valve bonnet 56, the positions of rib 66 and notch 64 could be reversed. In addition, while only one rib 66 and one notch 64 is preferably used so that valve bonnet 56 can be installed on valve body 54 in only position, multiple ribs 66 interfitting in multiple notches 64 could be used as long as holes 58 overlie one another in any of the interfitting positions. Moreover, the shape of rib 66 and notch 64 can obviously vary as long as some alignment member interfits with an appropriately shaped alignment recess. For example, rib 66 could comprise a circular vertical post and notch 64 could comprise a circular hole for receiving this post.

An indicator could also be formed on attachment members 60 without using the junction between the threaded and smooth portions 68 and 70 as such an indicator. For example, attachment members 60 could be threaded over their entire length as long as a visible line or marking were provided thereon at the same location as the junction between the threaded and smooth portions 68 and 70. Such a marking would inform the user of when attachment members 60 were clear of valve body 54 but were still captured within bonnet 56 in the same way as the junction between the threaded and smooth portions 68 and 70.

Metering pin 24 can also be used in valves 2 not having a flow control stem 42. In this case, the top end of pin 24 would simply be supported in valve bonnet 56. Again, pin 24 would preferably be long enough and/or flexible enough to permit side-to-side motion of pin 24 within metering hole 22 as valve member 14 slides relatively to pin 24.

Accordingly, the invention is to be limited only the by the appended claims.

We claim:

1. An irrigation valve, which comprises:
   (a) a valve housing having an inlet, an outlet, a flow passageway between the inlet and outlet, a valve seat in the flow passageway, and a valve member which closes the valve by moving into engagement with the valve seat for blocking flow between the inlet and the outlet and which opens the valve by moving out of engagement with the valve seat for permitting flow between the inlet and the outlet;
   (b) wherein the valve housing is formed from a valve body and a valve bonnet which are joined together, wherein the valve body and valve bonnet each have a plurality of attachment holes which receive a plurality of attachment members to join the valve body and valve bonnet together; and
   (c) at least one alignment member and at least one alignment recess provided on the valve body and valve bonnet with the at least one alignment member and the at least one alignment recess interfitting together when the valve body and valve bonnet are joined together, wherein the at least one alignment member comprises an outwardly protruding rib and the at least one alignment recess comprises a notch, wherein the rib and the notch are located on external vertical surfaces of the valve body and the valve bonnet such that the rib and notch are continuously visible to an assembler both before and after the valve body and the valve bonnet are joined together, and wherein the rib and notch are so disposed on the valve body and valve bonnet that the attachment holes in the valve bonnet overlie the attachment holes in the valve body when the rib and notch are interfitted together.

2. The valve of claim 1, wherein the rib is carried on the valve body and the notch is carried on the valve bonnet.

3. The valve of claim 2, wherein the valve bonnet has a skirt that is concentrically received around a portion of the valve body when the valve bonnet and the valve body are joined together, and wherein the notch is formed in the valve bonnet skirt.

4. The valve of claim 3, wherein the rib is provided on the valve body which rib is shaped to interfit in the notch on the valve bonnet skirt with at least one rib being interfit into at least one notch when the valve body and the valve bonnet are joined together.

5. The valve of claim 1, wherein only one rib and one notch are provided on the valve body and the valve bonnet to permit the valve bonnet to be joined to the valve body in only one position.

6. The valve of claim 1, wherein the attachment holes in the valve bonnet and valve body comprise threaded holes, and wherein the attachment members each have a lower threaded portion whose threads mate with the threaded holes in the valve bonnet and the valve body and an upper smooth portion located between the threaded portion and an upper head of the attachment member, and wherein the length of the threaded and smooth portions of the attachment member is chosen so that the threaded portion of the attachment member will be withdrawn from a threaded hole in the valve body but will still be received in a threaded hole in the valve bonnet when the attachment member is partially unscrewed and when a junction between the threaded and smooth portions of the attachment member is at the top of the threaded hole in the valve bonnet such that substantially the entire smooth portion of the threaded attachment member is visible to the user.

7. The valve of claim 6, wherein the threaded attachment members comprise threaded screws.

* * * * *